United States Patent
Davison et al.

(10) Patent No.: US 7,366,189 B2
(45) Date of Patent: Apr. 29, 2008

(54) METHOD AND APPARATUS FOR ASSOCIATING PVC IDENTIFIERS WITH DOMAIN NAMES OF HOME GATEWAYS

(75) Inventors: Michael Davison, Aberdine, WA (US); Rene Tio, Sunnyvale, CA (US); David Langley, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 623 days.

(21) Appl. No.: 10/970,899

(22) Filed: Oct. 21, 2004

(65) Prior Publication Data
US 2005/0078691 A1    Apr. 14, 2005

Related U.S. Application Data

(63) Continuation of application No. 09/107,743, filed on Jun. 30, 1998, now Pat. No. 6,829,242.

(51) Int. Cl.
*H04L 12/66* (2006.01)
*H04L 12/28* (2006.01)
*H04J 3/16* (2006.01)
*G06F 15/16* (2006.01)

(52) U.S. Cl. ............... 370/401; 709/227; 709/245; 370/395.2; 370/437; 370/463; 370/395.3

(58) Field of Classification Search ............... None
See application file for complete search history.

(56) References Cited

U.S. PATENT DOCUMENTS

| | | | |
|---|---|---|---|
| 5,740,075 A | 4/1998 | Bingham et al. | |
| 5,748,493 A | * 5/1998 | Lightfoot et al. | ............ 709/227 |
| 5,805,820 A | 9/1998 | Bellovin et al. | |
| 5,943,426 A | 8/1999 | Frith et al. | |
| 5,974,314 A | * 10/1999 | Hudson | ............ 455/427 |
| 6,061,650 A | 5/2000 | Malkin et al. | |
| 6,073,176 A | 6/2000 | Baindur et al. | |
| 6,115,382 A | 9/2000 | Abe | |
| 6,119,234 A | 9/2000 | Aziz et al. | |
| 6,154,461 A | 11/2000 | Sturniolo et al. | |
| 6,463,475 B1 | 10/2002 | Calhoun | |
| 6,490,620 B1 | 12/2002 | Ditmer et al. | |
| 6,560,634 B1 | 5/2003 | Broadhurst | |

* cited by examiner

*Primary Examiner*—Ronald Abelson
(74) *Attorney, Agent, or Firm*—Hickman Palermo Truong & Becker LLP

(57) ABSTRACT

A method and apparatus associates a domain name of a home gateway with one or more PVCs. After the PVC is established, a tunneling protocol is used to request the domain name of the home gateway, and the domain name is associated with the PVC. When a user logs on via an access communication device, the user will provide a domain name of a home gateway with which the user desires to communicate. A PVC associated with the home gateway is then used to allow the user to communicate with the home gateway. The domain name of the home gateway may be periodically verified to detect any changes.

13 Claims, 4 Drawing Sheets

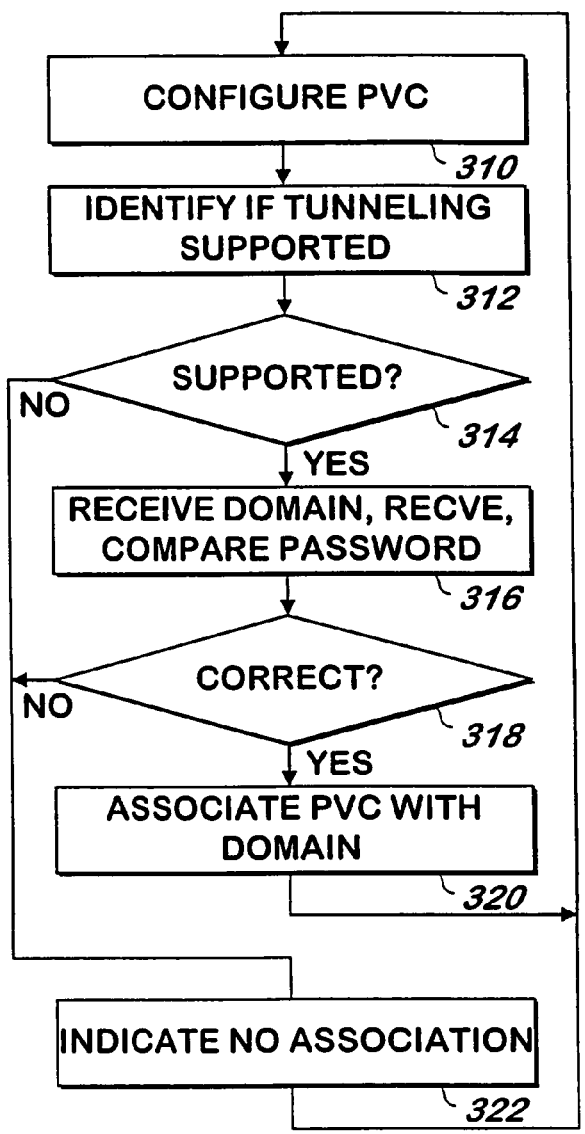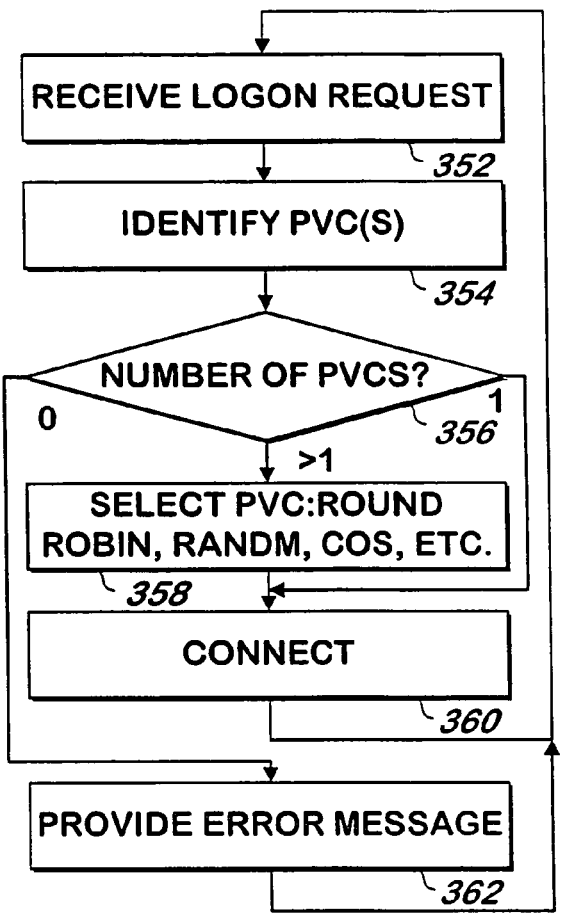
FIG. 3A
FIG. 3B

METHOD AND APPARATUS FOR ASSOCIATING PVC IDENTIFIERS WITH DOMAIN NAMES OF HOME GATEWAYS

RELATED APPLICATIONS

This application is a continuation application of and claims priority under 35 U.S.C. §120 to application Ser. No. 09/107,743, filed Jun. 30, 1998 now U.S. Pat. No. 6,829,242, which is a continuation-in-part application of:

issued U.S. Pat. No. 6,446,122, entitled, "METHOD AND APPARATUS FOR COMMUNICATING QUALITY OF SERVICE INFORMATION AMONG COMPUTER COMMUNICATION DEVICES," filed on Jun. 24, 1998, by Vipin Rawat and David Langley, and issued U.S. Pat. No. 6,700,890, entitled, "METHOD AND APPARATUS FOR CONFIGURING PERMANENT VIRTUAL CONNECTION (PVC) INFORMATION STORED ON NETWORK DEVICES IN AN ATM NETWORK LOGICALLY CONFIGURED WITH SUBNETWORKS," filed on Dec. 22, 1997, by Gabriel Lee and David Langley, each having the same assignee as this application and all of which are incorporated herein by reference in their entirety for all purposes as if fully set forth herein.

FIELD OF THE INVENTION

The present invention is related to computer networking and more specifically to computer network tunneling protocol software.

BACKGROUND OF THE INVENTION

The network of a network service provider may be connected to many different computer networks. This configuration allows the network service provider to provide Virtual Private Network (VPN) service to many different computer networks. A user of the service connects to the service provider's equipment, which accepts the connection and prompts the user for the destination network with which the caller wishes to communicate. The user provides an identifier of the destination network, and the network service provider connects the user to a home gateway of that destination network. The home gateway is a point of communication between the network service provider and the destination network. The destination network can then use security procedures to authenticate the user, and if properly authenticated, can allow communication with other equipment communicating with the destination network.

Conventional access communication devices route information using virtual circuits, which are paths through a network. In the example above, the virtual circuit is from a router or switch acting as the access communication device, through the network service provider's network and to the home gateway of the destination network that is connected to the service provider's network. The connection to the access communication device may be through a dial-in connection or a permanent connection. As used herein, an "access communication device" can be any device such as a switch or a router that can accept information from a computer or network device and send it to a specified number of several home gateways, or receive information from such home gateway and provide it to a computer or network device, or both. Described below are access communication devices that are reached by dial-in connections, but other forms of connections may be used.

Conventional access communication devices can support at least one of two forms of virtual circuits, SVCs and PVCs. SVCs are switched virtual circuits and are established as needed. When the SVC is no longer needed, it is torn down until it is needed again. PVCs are permanent virtual circuits, which are established and remain available for use even when they are not in use.

A network service provider may employ hundreds of access communication devices in different locations to provide coverage in a large geographic area. To allow dial-in user to select the nearest access communication device, the network service provider can publish a list of telephone numbers and corresponding locations. The user can identify on this list the location nearest the user, and then dial into the network service provider's network using the number or numbers corresponding to the neared location identified.

When the user wishes to connect to a destination network served via a virtual circuit on the service provider's network, the user establishes a connection to the access communication device (e.g. by dialing in or using an existing connection), supplies an identifier of the destination network he or she wishes to access and may supply other information. This other information may be the user's logon name. The identifier of the destination network may be a domain name. For example, the user may specify "xyz@cisco.com". The user's logon name is the text "xyz" before "@" and the domain name is the text "cisco.com" after "@". The access communication device can then route the call using the identifier of the network or home gateway supplied by the user, by matching the identifier of the destination network requested by the user with an available virtual circuit to that network.

To match a domain name of the destination network with an available SVC, a database is used. The database stores the domain name of the home gateway associated with the network address of the home gateway. The network address can then be retrieved using the domain name received from the user, and an SVC is set up between the access communication device and the home gateway using the network address. This capability is similar to the way people place a conventional telephone call to another person: a knowing the name of the desired party, a telephone book is consulted to locate the telephone number, which is used to place the call. Like an individual's telephone number, the network address used to reach a home gateway via an SVC is the same from any access communication device. In other words, it is globally unique, allowing every access communication device to refer to a home gateway using the same identifier. Once the information is entered into the database, it may be made available to any access communication device in the service provider's network for use as described above.

Unlike the SVC case above, every access communication device in a network using PVCs does not refer to a home gateway using the same identifier as every other access communication device. If a PVC is used to connect to the home gateway rather than an SVC, then it is necessary to know the identifier of the PVC that connects the access communication device to the home gateway. Every access communication device can use a different numbering scheme for its PVCs used to reach the same set of home gateways. Using the telephone analogy above, it is as if everyone can place telephone calls but only using a user-programmable ten-digit speed dial code, which is different on every telephone that originates the call. Every telephone would require its own customized directory, and a central directory would be useless. To allow users of access communication devices to reach home gateways using PVCs, every access communication device must maintain its own database. Creating and maintaining multiple versions of the database would be too cumbersome and error-prone to implement.

What is desired is a method and apparatus that can allow a user to enter a domain name to access a destination network in a service provider's network using PVCs without requiring manual data entry to relate each PVC identifier of each access communication device with an identifier of the destination network served by that PVC.

SUMMARY OF THE INVENTION

When a PVC is established, a method and apparatus uses a tunneling protocol to request the domain name and other characteristics of the home gateway served by that PVC. The domain name is then automatically matched with the identifier of the PVC and stored in a list. If desired, conventional tunneling protocol security features may be employed to prevent a home gateway from masquerading as a home gateway to a different network by providing an incorrect domain name identifier. When a user uses an access communication device to establish a connection with the home gateway, the domain name received by the user is used to find the PVCs serving that home gateway using the list. If multiple PVCs serve the requested home gateway, the least utilized PVC or a PVC than has a capacity specified by the user may be selected to carry the call, helping to balance the load among all of the PVCs serving the requested home gateway. Because the process is performed automatically after the PVC is established, little or no data entry is required to match the PVC with the domain name of the network of the home gateway served by that PVC, and thus, the process is simpler to administer and less prone to error.

BRIEF DESCRIPTION OF THE DRAWINGS

FIG. 3A is a flowchart illustrating a method of associating a PVC with the domain name of the home gateway served by the PVC according to one embodiment of the present invention.

FIG. 3B is a flowchart illustrating a method of routing a user to a PVC serving a requested home gateway according to one embodiment of the present invention.

DETAILED DESCRIPTION OF THE PREFERRED EMBODIMENT

Figure 1:
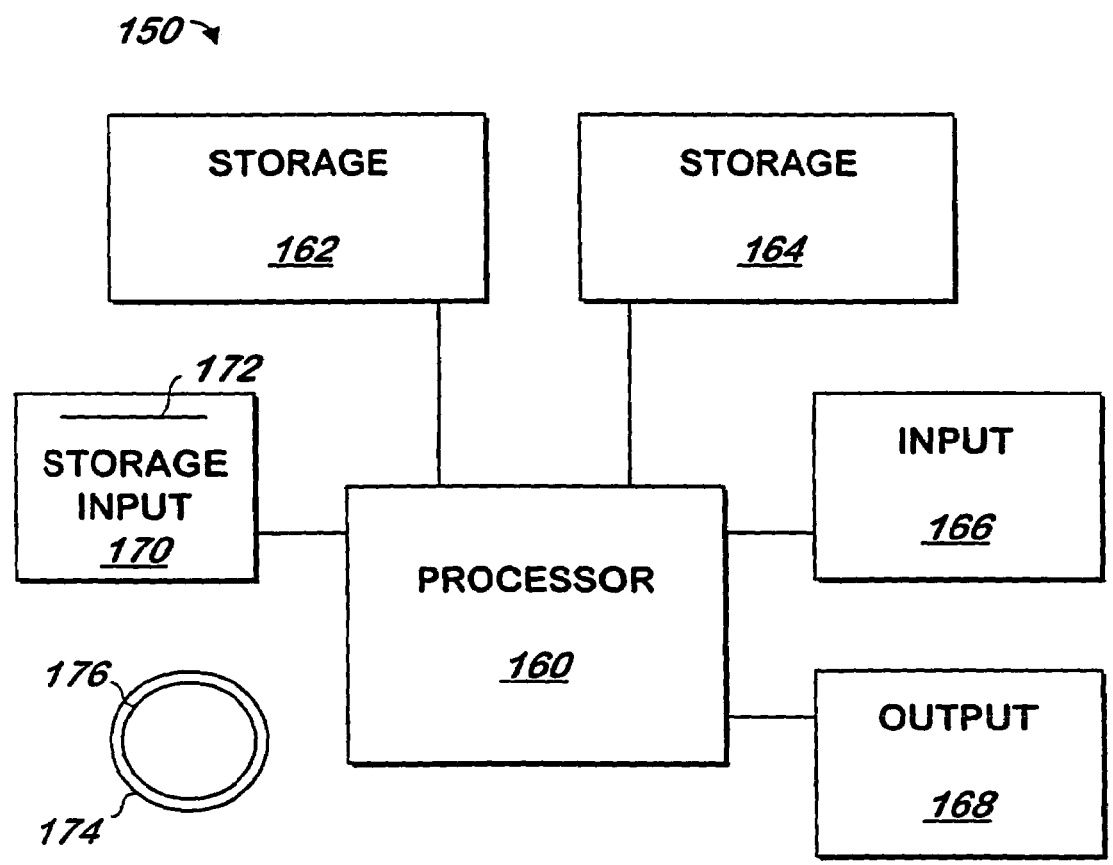
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-RCM or other nonvolatile storage media that may be used to transport computer instructions or data to the system 150. Computer program product 174 has encoded thereon computer readable program code devices 176, such as magnetic charges in the case of a which are encoded as program instructions, data or both to configure the computer system 150 to operate as described below.

In one embodiment, each computer system 150 is a conventional Sun Microsystems Ultra 1 Creator computer running the Solaris 2.5.1 operating system commercially available from Sun Microsystems of Mountain View, Calif., although other systems may be used. For example, the present invention may be implemented as a part of a conventional access communication device such as the Cisco AS5XOO line of products (AS5200, AS5300, AS5800) commercially available from Cisco Systems, Inc., of San Jose, Calif.

Figure 2:
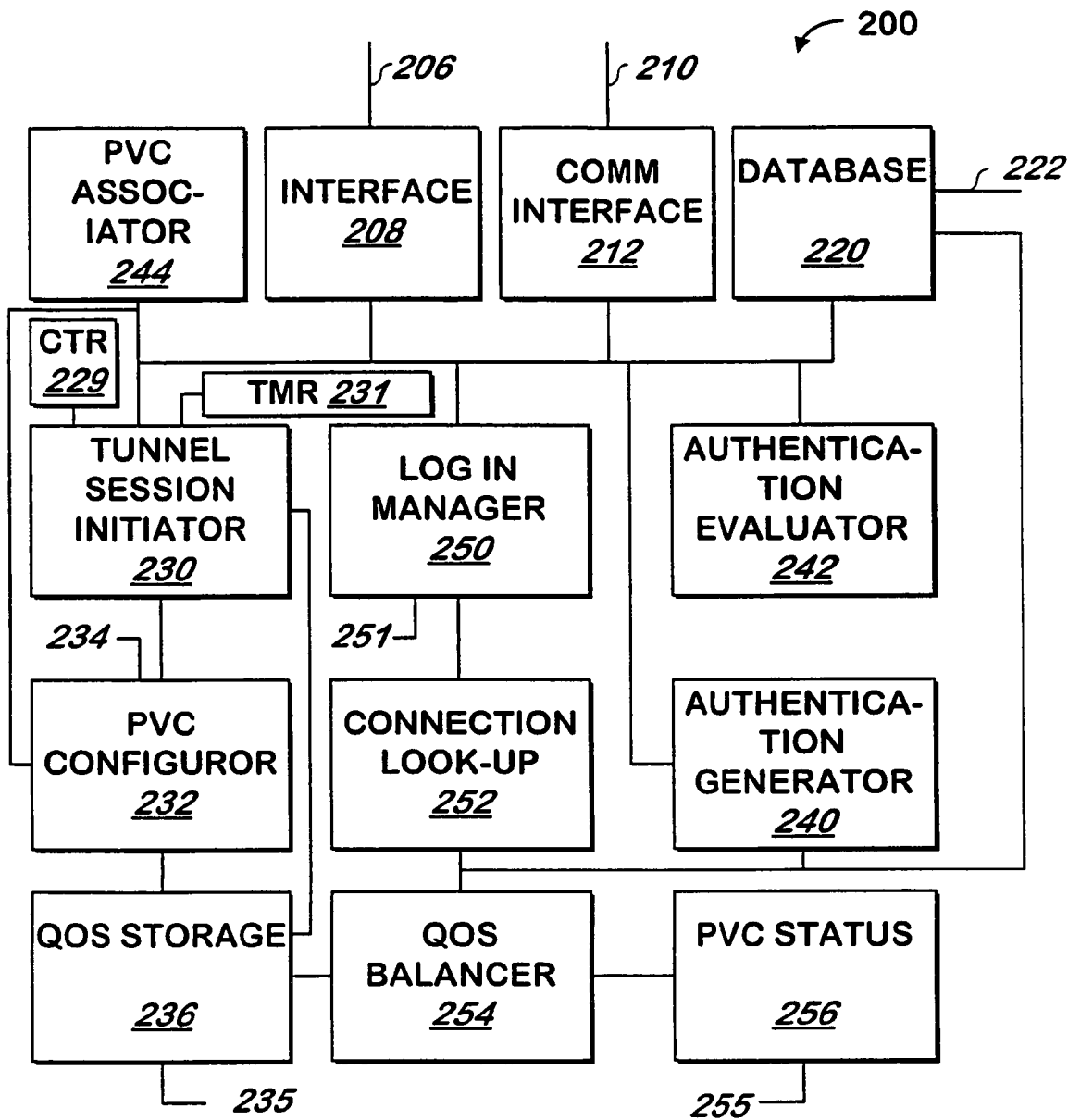
FIG. 2 is a block schematic diagram of an apparatus for routing access communication device users using a PVC serving a home gateway requested by the user according to one embodiment of the present invention.

Referring now to FIG. 2, an apparatus for routing users of an access communication device to home gateways of networks via one or more PVCs is shown according to one embodiment of the present invention. The apparatus may be a part of the access communication device, such as a switch or a router. PVC configuror 232 receives a command to initiate or establish the permanent virtual circuit via input/output 234 coupled to a conventional input device such as a conventional keyboard and mouse. In one embodiment, PVC configuror 232 is a conventional command interface for configuring PVCs, accepting commands from a system administrator via input/output 234 and configuring the PVC according to the commands.

In another embodiment, PVC coniiguror 232 requests configuration information from another device such as a switch coupled to PVC configuror 232 via input/output 234 via the conventional LMI protocol or the conventional ILMI protocol as described in copending applications "Method and Apparatus for Configuring Network Devices with Subnetworks" and "Method and Apparatus for Configuring Network Devices" described above.

As part of the initiation of the PVC, quality of service parameters are received an input 234 by PVC coniiguror 232. PVC coniiguror 232 passes the quality of service parameters to quality of service storage 236. PVC configuror 232 sets up the PVC by passing suitable information to communication interface 212. Communication interface 212 is coupled to each home gateway via a network coupled to input/output 210.

Upon establishment of a PVC, PVC configuror 232 signals tunnel session initiator 230 and provides the identifier of the PVC established to tunnel session initiator 230. Tunnel session initiator 230 creates a tunnel session initiation message, used to establish a tunnel session. In one embodiment, the conventional L2TP start-control-connection-request is used. Tunnel session initiator 230 provides to communication interface 212 the start-control-connectionrequest (SCCRQ) message to initiate a tunnel session over the PVC having the identifier received from PVC configuror 232.

In one embodiment, the tunnel session initiation message created by tunnel session initiator 230 contains challenge string for the home gateway to encript or hash and return in a response to the tunnel session initiation message in order to authenticate the response. The message may also contain any form of password, such as an encryption or hash key or a string encrypted by the apparatus 200 of the present invention. In such embodiment, tunnel session initiator 230 signals authentication generator 240 to provide the challenge string, an encryption or hash key, an encrypted string or other password that identifies the access communication device. As used herein, "password" means any identifier that can identify a device. A password can be a secret password, or can he a public or private encryption key or can be an encrypted string, which may have been recently received from the destination of the password. Authentication generator 240 provides any of a challenge string, a key (encryption or hash), an encrypted string or any other password to tunnel session initiator 230, which includes one or more of these items in the tunnel session initiation message.

Any protocol that allows tunneling or tunneling-like features may be used to initiate the tunnel session. Protocols such as L2TP, L2F, PPTP or IPSec may be used. L2TP is presently described at ftp://ftp.masinter.net/pub/12tp/draft-ietf-pppext⁻12tp⁻11.txt. L2F is presently described at http://info.internet.isi.edu/in-notes/rfc/files/rfc2341.txt.IPSec is presently described at http://search.ietf.org/internet-drafts/draft-ietf-ipsec-arch-sec-05.txt. PPTP is presently described at http//www.zendo.com/vandys/12tp-mail/draft-ietf-pppext-pptp-02.txt. It is noted that the above specifications may be updated or modified from time to time. The site http://www.ietf.org should he consulted for the latest information.

Communication interface 212 is coupled via input/output 210 to a communications network in communication with the home gateway accessed via the PVC. Communication interface 212 transmits via input/output 212 the initiation command, such as the conventional L2TP start-control-connection-request specified by tunnel session initiator 230, over the PVC specified by tunnel session initiator receipt by the home gateway.

If the home gateway does not support tunneling, no response or an improper response to the tunnel initiation message will he received by communication interface 212. If an improper response is received, communication interface passes it to tunnel session initiator 230 and tunnel session initiator 230 identifies the response as improper. If no response is received, timer 231 set by tunnel session initiator 230 when it sends the tunnel initiation command times out and notifies tunnel session initiator 230.

In one embodiment, if no response or an improper response is received to the tunnel initiation message, tunnel session initiator 230 does nothing further with respect to such PVC, and the apparatus shown in FIG. 2 does not attempt to automatically associate the PVC with a domain name as described in more detail below. In another embodiment, tunnel session initiator 230 uses timer 231 to periodically retry the tunnel initiation command a configurable number of times such as three times or zero or more times, keeping track of the number of times such command is sent using counter 229.

In one embodiment, each tunnel initiation command is made up of several subcommands, with each subcommand within one command using a different protocol, such as L2TP and then L2F. Tunnel session initiator 230 sends a command using one protocol, and sets timer 231 as described above. If an improper response or no response is received, a different protocol is used and tunnel session initiator continues this process until all protocols supported by tunnel session initiator 230 have been used. The process may be repeated a configurable number of times such as three times or zero or more times as described above or until a proper response is received by tunnel session initiator 230. If no response or improper responses are received, tunnel session initiator 230 indicates to PVC configuror 232 that the PVC cannot he automatically associated with a domain name. PVC configuror 232 may provide an error message via input/output 234 in response to this indication. The entity initiating the PVC can chose to manually associate the PVC with a host domain name in database 220 using input/output 222 or 234.

If the remote home gateway supports tunneling, communication interface 212 receives via input/output 210 a conventional response to the tunnel session initiation message, such as the conventional L2TP start-control-connection-reply (SCCRP) message. Communication interface 212 passes this response to tunnel session initiator 230.

In one embodiment, the response received by tunnel session initiator 230 contains a version of the challenge string sent in the tunnel session initiation message described above that has been hashed or encrypted using a key. In another embodiment, the response received includes a hash or encryption key, used to decrypt subsequent messages sent by the remote home gateway. Tunnel session initiator 230 provides the domain name received in the response from the remote home gateway and the hashed or encrypted challenge string or key received from communication interface 212 to authentication evaluator 242.

Authentication evaluator 242 uses the domain name and the hashed or encrypted challenge string or the key to authenticate the response as having been sent by the proper remote home gateway. In one embodiment, the domain name and hash or encryption key or keys of each home gateway with which PVCs may be established by PVC configuror 232 are entered and stored in database 220 via input/output 222 coupled to a conventional input device, such as a conventional keyboard and mouse. Authentication evaluator 242 requests from database 220 the hash or encryption key corresponding to the domain name received as described above. (As described below, one or more identifiers other than the host name may be used to retrieve the hash or encryption key). Database 220 provides to authentication evaluator 242 this key, by locating the domain name or identifier in an indexed list of identifiers either by locating an exact duplicate or by locating a similar name or identifier in those stored using conventional pattern or mnemonic matching techniques. Authentication evaluator 242 either compares the key provided by database 220 with that provided by tunnel session initiator 230, or uses the key received from database 220 to hash or decrypt the hashed or encrypted challenge string received from tunnel session initiator 230 and compares it to the challenge string it provided as described above. Authentication evaluator 242 provides to tunnel session initiator 230 an indication of whether or not such a match occurred. In an alternate embodiment, the domain name is passed to database 220 by tunnel session initiator 230 and authentication evaluator 242 receives the corresponding key from database 220. In another embodiment, the SCCRP contains a host name or other identifier instead of a domain name, and the host name is used for the lookup into database 220, which stores host and domain names. Database 220 additionally returns the domain name either to tunnel session initiator 230 or authentication evaluator 242.

If the authentication evaluator 242 signals no such match occurred, tunnel session initiator 230 may retry using the timer 231 and counter 229 as described above. If the key still does not match any of the retries, tunnel session initiator 230 signals PVC configuror 232, which provides an indication of the failed attempt to ascertain the proper domain name of the PVC via input/output 234 and allows manual association as described above.

In one embodiment, the response received by tunnel session initiator 230 contains a challenge string from the home gateway. Tunnel session initiator 230 provides the challenge string to authentication generator 240, which hashes the challenge string using its own hash key and provides the result to tunnel session initiator 240. The SSCRP may also contain the number of tunnel sessions the home gateway can support. Tunnel session initiator 230 stores this information into QoS storage 236 for use as described below.

If the encryption key matches on the initial attempt or a subsequent retry, tunnel session initiator 230 completes the tunnel protocol handshake by passing one or more additional messages, such as the conventional L2TP start-control-connection-connect (SCCCN) message, to communication interface 212, intended for the PVC specified previously. This message may include the challenge received from the home gateway that has been hashed or encrypted by authentication generator 240. Communication interface 212 passes these one or more additional commands to the home gateway served by the PVC via input/output 210 and the network to which it is connected.

Additionally, tunnel session initiator 230 provides to PVC associator 244 the identifier' of the PVC and the domain name, either the one received over the PVC or one received from database 220 by tunnel session initiator 230 either directly from database 220 or via authentication evaluator 242. PVC associator 244 stores in database 220 the identifier of the PVC associated with the domain name in database 220.

The above process can be repeated for each PVC that is configured or for a special group of PVCs such as those being configured by a particular user or process or those marked for automatic domain name detection by the user via input/output 234, or any other special group. If necessary, tunnel session initiator 230 can queue PVC identifiers received from PVC configuror 232 if the operation of the apparatus described above takes longer than the configuration of PVCs by PVC configuror 232. Additionally, multiple associations may be in process as described above simultaneously with one another. The associations made between a domain name and one or more PVCs are used as described below.

When a caller dials into interface 208 via communication line 206, or otherwise wishes to establish a connection with a remote home gateway, interface 208 receives from the caller a domain name corresponding to the home gateway to which the caller requests to be connected and other information such as the user's logon or user name or other identifier. Interface 208 provides this domain name to logon manager 250. Login manager 250 provides the domain name it receives from interface 208 to connection lookup 252. Connection look up 252 requests from database 220 all PVCs associated with the domain name requested. If no PVCs are associated with the domain name received, connection lookup 252 signals log in manager 250, which provides an error message to the user via interface 208 and input/output 206.

If the database 220 responds with more than one PVC that is associated with the domain name, connection lookup 252 provides the list of the identifiers of more than one PVC to Quality of Service balancer 254. Quality of Service balancer 254 selects one of these PVCs using any of several possible selection techniques.

One such technique is to use a "round robin" approach, with Quality of Service balancer 254 selecting a first PVC identifier from the list of PVCs provided by connection lookup 252, and keeping track of which identifier from the list was last used (e.g. by marking it in the database 220). The next time that same list is presented to Quality of Service balancer 254, Quality of Service balancer 254 will select the identifier of the PVC after the last used identifier, starting again at the top of the list after all of the identifiers have been selected.

Another way Quality of Service balancer 254 can select one of the PVC identifiers is to select one at random. Still another way is for Quality of Service balancer 254 to select one PVC from the list and then always select the same PVC from that list until that PVC is fully used, as defined by the number of tunnel sessions the home gateway can support that is stored in QcS storage 236, or by the bandwidth available or other considerations, and then select another PVC. Quality of Service balancer 254 maintains in QoS storage 236 the amount of the PVC used and locates its capacity from QoS storage 236. Other processes may also maintain this information in QoS storage 236 via input/output 235, for example when a user logs off and frees up the capacity formerly used on the PVC.

Another way Quality of Service balancer can select a PVC from the list of PVC identifiers is using class of service designations. Quality of Service balancer 254 provides the identifiers of these PVCs to PVC status 256, which receives at input 255 from the conventional routing software in the access communication device, for each PVC configured by PVC configuror 232, the level at which the PVC is being used, such level corresponding to the quality of service parameters stored in quality of service storage 236. PVC status 256 provides this level for each PVC specified to quality of service balancer 254. Quality of service balancer 254 retrieves from quality of service storage 236 the corresponding quality of service parameters for each such PVC. Quality of service balancer 254 selects from the PVCs received from connection lookup 252 the PVC having the lowest utilization as defined by the quality of service parameters stored in quality of service storage 236. In one embodiment, the determination is made based on the class of service associated with the user attempting to connect to the home gateway, and the maximum bandwidth of the incoming connection.

Certain PVCs may be designated as general PVCs and users with lower classes of service will be sent to those PVCs. The maximum bandwidth of all connections on the general PVCs is allowed to exceed the capabilities of the PVC. Database 220 stores the class of service for each user of group of users and QOS storage 236 stores the class of service of the PVC. Quality of Service balancer 254 consults database 220 to determine whether to assign the user a general PVC. If so, the general PVC with the lightest percentage utilization of bandwidth divided by the total of the maximum bandwidth of each user is selected if more than one such PVC is available. If the user has a higher class of service, Quality of Service balancer 254 selects a PVC that has adequate bandwidth available. Quality of Service balancer 254 maintains in Quality of Service Storage 236 the current maximum bandwidth for all users using each PVC to allow Quality of Service Balancer to make the proper selection. Quality of Service balancer 254 provides the identifier of the selected PVC to connection lookup 252.

Connection lookup 252 provides the PVC identifier received from Quality of Service balance 254, or if a single PVC identifier was received from database 220, connection lookup 252 provides this identifier to login manager 250. Log in manager 250 associates the port over which the user is communicating with interface 208 with the PVC received from connection lookup 252. Log in manner 250 provides at output 251 the port identifier of the interface 208 at which the user is connected and the PVC identifier so that a connection may be established from the port at interface 208 and the PVC identifier. The connection may be established using a session of the tunnel that was used to identify the domain name of the home gateway as described above.

Communication between the user and the home gateway thus established, log in manager 250 provides to communication interface 212 the user name or other information received from the user for sending via the PVC selected. Additional communications between the user and the home gateway served by the PVC may be sent using the PVC in the conventional fashion and by conventional systems.

It is possible that a domain may change its name. In one embodiment, tunnel session initiator 230 uses timer 231 to periodically poll each home gateway which has been identified as described above to resend its domain name, for example using the conventional L2TP echo and echo reply messages. Echo and echo reply may be used if the tunnel is still up, otherwise, tunnel session initiator 230 reinitiates the tunnel using a tunnel initiation message to obtain the domain name as described above.

Tunnel session initiator requests from database 220 the domain name associated with the PVC from which the domain name has been received. If the domain name received is different from that stored in database 220, the domain name of the home gateway has changed. Tunnel session initiator 230 signals the apparatus 200 to perform the technique described above to initiate a new tunnel over the same PVC no reauthenticate the new domain name of the home gateway. If desired, tunnel session initiator can mark the tunnel for deletion, signaling log in manager 250 to instruct the device coupled to output 251 to switch active users of the PVC to the new tunnel and signal log in manager 250 via input/output 251 or wait until all active users have stopped using the tunnel and signal log in manager 250 via input/output 251, When log in manager 250 receives this signal, it notifies tunnel session initiator 230, which can delete the tunnel associated with the former domain name. Tunnel session initiator 230 then signals PVC associator 244 with the identifier of the PVC. PVC associator 244 disassociates in database 220 the PVC identifier with the old domain name.

Referring now to FIG. 3A, a method of associating a PVC with a home gateway identified by a domain name or other identifier is shown according to one embodiment of the present invention. A PVC is configured 310. In one embodiment, configuring a PVC 310 involves receiving one or more Quality of Service parameters and either receiving or generating an identifier of the PVC.

A determination is made whether the remote home gateway supports tunneling 312. In one embodiment, such determination 312 is performed by transmitting a tunnel session initiation message as described above using one protocol and setting a timer, and responsive to no response after a period of time indicated by the timer or after receipt of an improper response to such command, transmitting a tunnel initiation message using a different protocol and setting the timer, and repeating this process until tunnel initiation commands using all protocols have been transmitted a number of times or until a proper response to the message is received. The number of protocols used may be one or more and the number of repetitions may be zero or more. In one embodiment, a challenge string is generated and sent with the tunnel session initiation message as described above.

If tunneling is not supported 314 as indicated by improper responses, an improper hash or encryption key or keys or a hashed or encrypted challenge string that does not properly decrypt or hash to the challenge string sent in the tunnel session initiation message, or no response to each such message, all described above, a message indicating no association between a PVC and a remote host gateway domain name has been made may be provided 322. As described above, a manual association may be made as part of step 322.

If tunneling is supported 314, a domain name or other identifier and password such as a hash key, encryption key or hashed or encrypted challenge string is received 316 as a part of the response to the message sent in step 312 as described above. The password received is compared against the correct password looked up as described above 316. If the password is correct 318, the PVC established in step 310 is associated 320 with the domain name received in step 316 for use as described below. If the password is incorrect or is not received after zero or more retries of the password request message 318, the method continues at step 322 described above, and following step 322, the method continues at step 310.

As described above, in one embodiment, the configuration of PVCs in step 310 may be performed concurrently with the other steps in FIG. 3A, and step 310 includes queuing the identifiers of the PVCs configured. Step 312 includes removing a PVC identifier from the queue and the remaining steps 314-322 are performed with respect to the most recent PVC identifier removed from the queue. Step 310 then follows step 322. In addition, multiple threads of the method shown in FIG. 3A may be performed concurrently with one another.

It is noted that more than one PVC may be associated with a single domain name according to one embodiment of the present invention.

Referring now to FIG. 3B, a method of associating a port on an access communication device with a PVC is shown according to one embodiment of the present invention. A log on request (also referred to as a log in request) is received 352. In one embodiment, the log on request received instep 352 contains a home gateway domain name and may include other information such as a user name. The domain name received in step 352 is compared 354 to a list of known domain names and their corresponding PVCs, such as that generated as described above with respect to FIG. 3A. If the result of step 354 is zero PVCs associated with such domain name, the method continues at step 362. In one embodiment, an error message is provided 362 to the device from which the log on request was received in step 352 and the method continues at step 352.

If more than one PVC is identified in step 354 as corresponding to the domain name 356, one of the PVCs is selected 358 using any of the techniques described above. Those techniques include round robin, random selection, fill one PVC up then move to the next, class of service or any other technique. The PVC identified in step 358, or if only one PVC is identified in step 354, the PVC identified in step 354 is used to connect 360 the device from which the log on request was received in step 352 using the PVC identified in step 358 or 354 as described above. The connection may be established using a session of the tunnel that was used to identify the domain name of the home gateway as described above with reference to FIG. 3A.

In one embodiment, step 352 includes receiving a user name and step 360 includes providing the user name to the home gateway via the PVC identified in step 354 if only one such PVC is identified or the PVC identified in step 358 if step 354 resulted in multiple PVCs. The method continues at step 352.

Figure 3C:
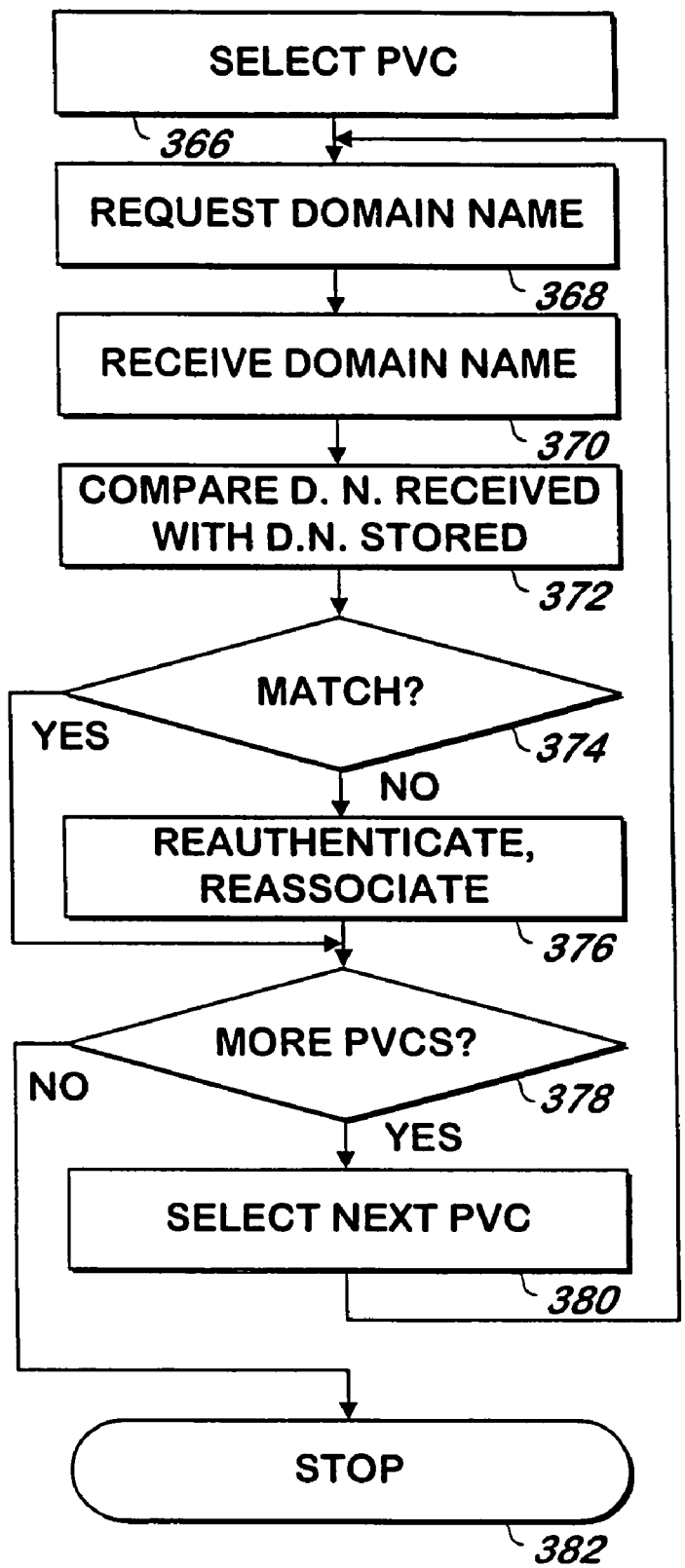
FIG. 3C is a flowchart illustrating a method of verifying the domain name associated with a PVC according to one embodiment of the present invention.

Referring now to FIG. 3C, a method of verifying the domain name associated with a PVC is shown according to one embodiment of the present invention. A PVC associated with a domain name as described above with respect to FIG. 3A is selected 366 and the domain name of the PVC is requested 368, for example using an echo message as described above. The domain name is received 370 and compared 372 with the domain name associated with the PVC as described above with respect to FIG. 3A. If the domain name received matches the domain name associated with the selected PVC 374, either exactly or using pattern matching or mnemonic matching techniques described above, if additional PVC's exist 378, another PVC is selected 380 and the method continues at step 368. If no additional PVC's exist 378, the method terminates, 382 and may be periodically completely re-executed as described above. If the comparison of step 372 does not result in a match 374, the domain name is reauthenticated 376 and reassociated with the identifier of the PVC as described above with respect to FIG. 3A, and the method continues at step 378.

What is claimed is:

1. An apparatus for communicating with a home gateway, comprising:
    a network interface that is coupled to a data network for receiving one or more packet flows therefrom;
    a processor; and
    one or more stored sequences of instructions which, when executed by the processor, cause the processor to carry out the steps of: receiving an identifier of a permanent virtual circuit (PVC) capable of use for communication with the home gateway;
        providing for receipt by the home gateway a message intended to cause the home gateway to provide a domain name of the home gateway;
        receiving the domain name of the home gateway requested; and
        associating the domain name of the home gateway received with the identifier of the PVC received.

2. An apparatus for communicating with a home gateway, comprising:
    a network interface that is coupled to a data network for receiving one or more packet flows therefrom;
    a processor; and
    one or more stored sequences of instructions which, when executed by the processor, cause the processor to carry out the steps of:
        receiving an identifier of a permanent virtual circuit (PVC) capable of use for communication with the home gateway;
        providing for receipt by the home gateway a message intended to cause the home gateway to provide an identifier of the home gateway;
        receiving the identifier of the home gateway requested; and
        associating the identifier of the home gateway received with the identifier of the PVC received;
            wherein the providing step comprises sending at least one message using a tunneling protocol.

3. An apparatus for communicating with a home gateway, comprising:
    a network interface that is coupled to a data network for receiving one or more packet flows therefrom;
    a processor; and
    one or more stored sequences of instructions which, when executed by the processor, cause the processor to carry out the steps of:
        receiving an identifier of a permanent virtual circuit (PVC) capable of use for communication with the home gateway;
        providing for receipt by the home gateway a message intended to cause the home gateway to provide an identifier of the home gateway;
        receiving the identifier of the home gateway requested;
        associating the identifier of the home gateway received with the identifier of the PVC received;
        receiving a first password for the home gateway;
        providing a message intended for the home gateway that will cause the home gateway to provide a second password;
        receiving the second password; and
        comparing the first password received with the second password received;
            wherein the associating step is responsive to the comparing step.

4. The apparatus of claim 3, wherein the messages each comprise a tunneling protocol message.

5. An apparatus for communicating with a home gateway, comprising:
    a network interface that is coupled to a data network for receiving one or more packet flows therefrom;
    a processor; and
    one or more stored sequences of instructions which, when executed by the processor, cause the processor to carry out the steps of:
        receiving an identifier of a permanent virtual circuit (PVC) capable of use for communication with the home gateway;
        providing for receipt by the home gateway a message intended to cause the home gateway to provide an identifier of the home gateway;
        receiving the identifier of the home gateway requested;
        associating the identifier of the home gateway received with the identifier of the PVC received;
        receiving at least one communication comprising the identifier of the home gateway and at least one piece of information different from the identifier of the home gateway;
        retrieving at least one identifier of at least one PVC associated with the identifier of the home gateway; and
        providing to the home gateway the at least one piece of information via at least one PVC, at least one of said at least one PVC corresponding to the at least one identifier of the at least one PVC retrieved.

6. The apparatus of claim 5 wherein the steps further comprise the additional step of selecting at least one of the identifiers of at least one PVC retrieved, and
    wherein the providing step is responsive to the selecting step.

7. The apparatus of claim 6, wherein the selecting step comprises:
    identifying a utilization of at least two PVCs corresponding to the at least one identifier retrieved; and
    selecting the identifier of one of the at least two PVCs having the lower utilization identified.

8. The apparatus of claim 5, wherein the at least one piece of information comprises a user identifier.

9. An apparatus for communicating with a home gateway, comprising:
    a network interface that is coupled to a data network for receiving one or more packet flows therefrom;
    a processor; and
    one or more stored sequences of instructions which, when executed by the processor, cause the processor to carry out the steps of:
        receiving an identifier of a permanent virtual circuit (PVC) capable of use for communication with the home gateway; and
        in response to receiving the identifier, sending a message to the home gateway, wherein the message requests the home gateway to provide an identifier of the home gateway.

10. The apparatus of claim 9, wherein sending the message comprises sending the message through the PVC identified.

11. The apparatus of claim 9, wherein the steps further comprise:
    receiving, in response to the message, an identifier of the home gateway.

12. The apparatus of claim 9, wherein the steps further comprise:
    in response to the message, receiving, through the PVC identified, an identifier of the home gateway.

13. The apparatus of claim 9, wherein the steps further comprise:
    receiving, in response to the message, an identifier of the home gateway; and
    in response to receiving the identifier of the home gateway, storing an association between the identifier of the home gateway and the identifier of the PVC.

\* \* \* \* \*